United States Patent
Meyer et al.

(10) Patent No.: US 10,646,736 B2
(45) Date of Patent: May 12, 2020

(54) PREACTION SPRINKLER VALVE ASSEMBLIES, RELATED DRY SPRINKLER DEVICES ADAPTED FOR LONG TRAVEL, AND FIRE PROTECTION SPRINKLER SYSTEMS

(71) Applicant: Globe Fire Sprinkler Corporation, Standish, MI (US)

(72) Inventors: Stephen J. Meyer, Chester Springs, PA (US); Yoram Ringer, Providence, RI (US); Thomas Edwin Archibald, Midland, MI (US)

(73) Assignee: Victaulic Company, Easton, PA (US)

(*) Notice: Subject to any disclaimer, the term of this patent is extended or adjusted under 35 U.S.C. 154(b) by 83 days.

(21) Appl. No.: 15/648,861

(22) Filed: Jul. 13, 2017

(65) Prior Publication Data

US 2017/0340911 A1 Nov. 30, 2017

Related U.S. Application Data

(63) Continuation-in-part of application No. 15/222,770, filed on Jul. 28, 2016, now Pat. No. 9,901,763.

(Continued)

(51) Int. Cl.
*A62C 37/42* (2006.01)
*A62C 37/48* (2006.01)
(Continued)

(52) U.S. Cl.
CPC .............. *A62C 37/42* (2013.01); *A62C 3/004* (2013.01); *A62C 35/62* (2013.01); *A62C 37/11* (2013.01);
(Continued)

(58) Field of Classification Search
CPC .......... A62C 37/42; A62C 37/11; A62C 37/48; A62C 3/004; A62C 35/62; F16K 31/002; F16K 31/465; F16K 1/2007
See application file for complete search history.

(56) References Cited

U.S. PATENT DOCUMENTS

| 1,182,460 A | 5/1916 | Cruger |
| 2,251,422 A | 8/1941 | Rider |

(Continued)

FOREIGN PATENT DOCUMENTS

| CN | 103845836 A | 6/2014 |
| DE | 20209353 U1 | 11/2002 |

(Continued)

OTHER PUBLICATIONS

Int'l Preliminary Report on Patentability dated Jun. 19, 2018 in Int'l Application No. PCT/US2016/066979.

(Continued)

*Primary Examiner* — Eric Keasel
(74) *Attorney, Agent, or Firm* — Panitch Schwarze Belisario & Nadel LLP

(57) ABSTRACT

A thermal trigger assembly for remote mechanical actuation of another fire protection system component includes an activation component having a base and a movable member. A bias member biases the movable member from a preactivation to an activated position with respect to the base. A thermally responsive element retains the movable member in the preactivation position until a predetermined thermodynamic condition is reached, when the thermally responsive element loses structural integrity. A flexible connector includes a flexible hollow outer cable housing with one end configured to be stationarily (preferably fixedly) connected with the base. A flexible cable is inside the outer cable housing for sliding movement therein and has one end configured to be stationarily (preferably fixedly) connected (Continued)

with the movable member. The flexible cable is moved with respect to the outer cable housing by movement of the movable member upon loss of structural integrity by the thermally responsive element.

16 Claims, 8 Drawing Sheets

Related U.S. Application Data

(60) Provisional application No. 62/304,585, filed on Mar. 7, 2016, provisional application No. 62/267,445, filed on Dec. 15, 2015, provisional application No. 62/198,428, filed on Jul. 29, 2015, provisional application No. 62/197,927, filed on Jul. 28, 2015.

(51) Int. Cl.
| | |
|---|---|
| *F16K 31/46* | (2006.01) |
| *A62C 37/11* | (2006.01) |
| *A62C 3/00* | (2006.01) |
| *A62C 35/62* | (2006.01) |
| *F16K 1/20* | (2006.01) |
| *F16K 31/00* | (2006.01) |

(52) U.S. Cl.
CPC ............ *A62C 37/48* (2013.01); *F16K 1/2007* (2013.01); *F16K 31/002* (2013.01); *F16K 31/465* (2013.01)

(56) References Cited

U.S. PATENT DOCUMENTS

| | | | |
|---|---|---|---|
| 2,506,468 A | 5/1950 | Rider | |
| 2,865,225 A | 12/1958 | Huffman | |
| 3,309,028 A | 3/1967 | Zieg | |
| 3,392,787 A | 7/1968 | Weise | |
| 3,419,083 A | 12/1968 | Cholin et al. | |
| 3,463,235 A | 8/1969 | Flajole | |
| 3,463,236 A | 8/1969 | Flajole | |
| 3,616,860 A | 11/1971 | Willms | |
| 3,657,942 A * | 4/1972 | Sullivan ............ | F16C 1/16 623/58 |
| 3,684,023 A | 8/1972 | Champagne | |
| 3,722,596 A | 3/1973 | Livingston | |
| 3,734,191 A | 5/1973 | Johnson et al. | |
| 3,768,567 A | 10/1973 | Weise | |
| 3,779,318 A | 12/1973 | Livingston | |
| 3,911,940 A | 10/1975 | Johnson | |
| 3,924,687 A | 12/1975 | Groos | |
| 3,991,829 A | 11/1976 | Johnson | |
| 4,046,406 A | 9/1977 | Press et al. | |
| 4,082,148 A | 4/1978 | Willms | |
| 4,128,128 A | 12/1978 | Mears | |
| 4,201,014 A * | 5/1980 | Hess ............ | E05F 11/483 49/325 |
| 4,220,208 A | 9/1980 | Jackson et al. | |
| 4,258,795 A | 3/1981 | Hansen | |
| 4,368,782 A | 1/1983 | Bray | |
| 4,553,602 A | 11/1985 | Pieczykolan | |
| 4,854,388 A | 8/1989 | Wyatt | |
| 4,951,755 A | 8/1990 | Barnett et al. | |
| 4,976,320 A | 12/1990 | Polan | |
| 5,127,479 A | 7/1992 | Stehling et al. | |
| 5,188,184 A | 2/1993 | Northill | |
| 5,295,503 A | 3/1994 | Meyer et al. | |
| 5,396,959 A | 3/1995 | Macdonald | |
| 5,415,239 A | 5/1995 | Kotter et al. | |
| 5,533,576 A | 7/1996 | Mears | |
| 5,609,211 A | 3/1997 | Meyer et al. | |
| 5,669,449 A | 9/1997 | Polan et al. | |
| 5,775,431 A | 7/1998 | Ondracek | |
| 5,967,240 A | 10/1999 | Ondracek | |
| 6,029,749 A | 2/2000 | Reilly et al. | |
| 6,158,519 A | 12/2000 | Kretschmer | |
| 6,666,277 B2 | 12/2003 | Reilly | |
| 6,691,790 B1 | 2/2004 | MacDonald, III et al. | |
| 6,851,482 B2 | 2/2005 | Dolan | |
| 7,032,681 B1 | 4/2006 | Sprakel | |
| 7,055,612 B2 | 6/2006 | Jackson et al. | |
| 7,104,333 B2 | 9/2006 | Ringer | |
| 7,143,834 B2 | 12/2006 | Dolan | |
| 7,185,711 B2 | 3/2007 | Jackson et al. | |
| 7,322,423 B2 | 1/2008 | Ringer | |
| 7,353,881 B2 | 4/2008 | Akins et al. | |
| 7,373,720 B1 | 5/2008 | Jensen et al. | |
| 7,543,653 B2 * | 6/2009 | Reilly ............ | A62C 35/68 169/17 |
| 7,823,650 B2 | 11/2010 | Eckholm et al. | |
| 7,921,928 B2 | 4/2011 | Thompson et al. | |
| 8,083,002 B1 | 12/2011 | Golinveaux et al. | |
| 8,528,653 B1 | 9/2013 | Silva, Jr. et al. | |
| 8,584,767 B2 | 11/2013 | Johnson et al. | |
| 8,746,358 B2 | 6/2014 | Alchalel et al. | |
| 8,800,673 B2 | 8/2014 | Multer et al. | |
| 8,844,554 B2 | 9/2014 | Kikuchi et al. | |
| 8,887,822 B2 | 11/2014 | Polan | |
| 8,973,672 B2 | 3/2015 | Fraederich | |
| 9,121,521 B2 | 9/2015 | Girouard | |
| 9,339,673 B2 | 5/2016 | Shipman | |
| 9,345,918 B2 | 5/2016 | Bucher et al. | |
| 9,358,411 B2 | 6/2016 | Shipman | |
| 9,395,918 B2 | 7/2016 | Ho et al. | |
| 9,415,250 B2 | 8/2016 | Bucher et al. | |
| 9,415,256 B2 | 8/2016 | Inzer | |
| 9,901,763 B2 | 2/2018 | Meyer et al. | |
| 2003/0075343 A1 | 4/2003 | Ballard | |
| 2003/0132009 A1 | 7/2003 | Thompson | |
| 2004/0123989 A1 | 7/2004 | Sprakel et al. | |
| 2005/0121206 A1 | 6/2005 | Dolan | |
| 2007/0000671 A1 | 1/2007 | Reilly et al. | |
| 2007/0007020 A1 | 1/2007 | Chase | |
| 2007/0221388 A1 | 9/2007 | Johnson | |
| 2007/0267202 A1 | 11/2007 | Mariller | |
| 2010/0038099 A1 | 2/2010 | Thompson et al. | |
| 2011/0024138 A1 | 2/2011 | Multer et al. | |
| 2011/0214888 A1 | 9/2011 | Alchalel et al. | |
| 2012/0031630 A1 | 2/2012 | Stephens | |
| 2012/0199764 A1 | 8/2012 | Girouard | |
| 2012/0298383 A1 | 11/2012 | Shipman | |
| 2013/0037281 A1 | 2/2013 | Szentimrey et al. | |
| 2013/0199803 A1 | 8/2013 | Multer | |
| 2013/0319696 A1 | 12/2013 | Polan | |
| 2015/0060091 A1 | 3/2015 | Polan | |
| 2015/0075821 A1 | 3/2015 | Bucher et al. | |
| 2017/0028238 A1 | 2/2017 | Meyer et al. | |
| 2017/0340911 A1 | 11/2017 | Meyer et al. | |
| 2018/0043198 A1 | 2/2018 | Meyer et al. | |
| 2018/0361182 A1 | 12/2018 | Meyer et al. | |

FOREIGN PATENT DOCUMENTS

| | | |
|---|---|---|
| JP | 2000153005 A | 6/2000 |
| JP | 2001340485 A | 12/2001 |
| JP | 2003164543 A | 6/2003 |
| KR | 101259098 B1 | 5/2013 |
| WO | 2009108944 A2 | 9/2009 |
| WO | 2017075070 A1 | 5/2017 |

OTHER PUBLICATIONS

U.S. Appl. No. 62/246,561, filed Oct. 26, 2015.
Int'l Search Report and Written Opinion dated Jul. 27, 2018 in Int'l Application No. PCT/US2018/034148.
Office Action dated Jul. 9, 2018 in U.S. Appl. No. 15/380,605, by Meyer.
Int'l Search Report and Written Opinion dated Nov. 15, 2016 in Int'l Application No. PCT/US2016/044569.
Int'l Search Report and Written Opinion dated Feb. 24, 2017 in Int'l Application No. PCT/US2016/066979.

(56) References Cited

OTHER PUBLICATIONS

Series MJC Multiple Jet Controls DN20, DN25, DN50, 12 Bar BSPT Inlet & Outlets Threads, TYCO Fire Products Data Sheet, Oct. 2014, downloaded from web page: http://www.tyco-fire.com/TD_TFP/TFP/TFP1346_10_2014.pdf, Download Date: May 24, 2016, original posting date: uknown, 10 pages.

Wilkins, "The Use of Specific Application Sprinklers for Protecting Attics", Tyco Fire & Building Products, pp. 1-92 (Oct. 21, 2007).

Office Action dated Oct. 26, 2015 in U.S. Appl. No. 62/246,561.

Office Action dated Jul. 20, 2017 in U.S. Appl. No. 15/222,770, by Meyer.

Office Action dated Oct. 4, 2017 in U.S. Appl. No. 15/380,605, by Meyer.

Int'l Preliminary Report on Patentability dated Jan. 30, 2018 in Int'l Application No. PCT/US2016/044569.

Examination Report dated Feb. 14, 2020 in Australian Application No. 2018286522.

* cited by examiner

PREACTION SPRINKLER VALVE ASSEMBLIES, RELATED DRY SPRINKLER DEVICES ADAPTED FOR LONG TRAVEL, AND FIRE PROTECTION SPRINKLER SYSTEMS

CROSS-REFERENCE TO RELATED APPLICATIONS

This application is a continuation-in-part of U.S. patent application Ser. No. 15/222,770 filed Jul. 28, 2016, which claims the benefit of priority under 35 USC § 119(e) of U.S. Provisional Patent Applications No. 62/304,585 filed Mar. 7, 2016; No. 62/267,445 filed Dec. 15, 2015; No. 62/198,428 filed Jul. 29, 2015; and No. 62/197,927 filed Jul. 28, 2015. The contents of all of the applications identified in this paragraph are incorporated herein by reference.

BACKGROUND OF THE INVENTION

The present disclosure relates generally to fire protection, and, more particularly, to activation components for fire protection systems, and valves for use in fire protection systems.

Fire sprinkler system installation and operation are subject to nationally recognized codes. As is aptly pointed out in U.S. Patent Application Publication No. 2013/0199803, dry sprinklers are used in areas that are or may be exposed to freezing conditions, such as in freezers, unheated internal areas, walkways, etc. In typical dry-pipe systems, supply conduits run in a space where the water in the supply conduit is not subject to freezing. A dry sprinkler is attached to such supply conduit and extends into a space where the water would otherwise be subject to freezing.

As Publication No. 2013/0199803 further points out, the typical construction of a dry sprinkler comprises a tube ("drop") with a pipe connector at the inlet end of the tube (for connecting the inlet end to the supply pipe network of the fire suppression system), a seal member at the inlet end to prevent water from entering the tube, and a mechanism to maintain the seal at the inlet end until the sprinkler is activated. Typically, a nozzle with an outlet and a deflector is attached to the opposite, outlet, or nozzle end of the tube. Also, the tube is sometimes vented to the atmosphere to allow drainage of any condensation that may form in the tube. Such dry sprinklers are disclosed, for example, in U.S. Pat. No. 5,775,431. As shown generally in that patent, an actuating mechanism can include a rod or other similar rigid structure that extends through the tube between the nozzle end and the inlet end to maintain a seal at the inlet end. The actuating mechanism further may include a thermally responsive element that supports the rod or the like at the nozzle end and thereby supports the seal at the inlet end. Alternatively, the tube is also sealed at the nozzle end of the tube, and the rod is supported at the nozzle end by the seal member which is itself supported by a thermally responsive support element. In such arrangements, the space in the tube between the two seal members can be pressurized with a gas, such as dry air or nitrogen, or filled with a liquid such as an antifreeze solution. When an elevated temperature is experienced, the thermally responsive support element fails, thereby allowing the rod to move, releasing the inlet end seal (and also any outlet seal at the nozzle end of the tube) to allow water from the supply conduit to flow into and through the tube to the nozzle.

The rigid tube or "drop" portion of such conventional dry sprinklers of the type in U.S. Pat. No. 5,775,431 extends with the nozzle into the unheated area from a wet branch line (located in a heated area) and must be precisely aligned and installed while avoiding various architectural, structural, and mechanical obstructions typically found in commercial or industrial buildings. The installer has to first install wet main and branch supply line piping for a sprinkler system and then measure a suitable length for each dry sprinkler from the branch line to the desired height of the nozzle with respect to a ceiling or the like, as the spacing between the branch and the ceiling or desired position of the nozzle is generally not some accurately predetermined distance. Because the actuation rod has to extend between the inlet seal and the nozzle outlet seal or other support at the outlet end, each dry sprinkler like that in U.S. Pat. No. 5,775,431 is custom made for a given length. An installer will order dry sprinklers for the installation according to the lengths that are measured to within a fraction (i.e. ⅛) of an inch. Delivery typically takes a minimum of seven to ten business days and, depending upon backlog, can take weeks. This delays installation and completion of construction projects. Longer delays occur if mistakes are made in measuring or fabricating the sprinklers or the sprinklers are damaged in transit and replacement sprinklers are required, further delaying completion of the installation.

Some manufacturers have addressed installation difficulties at least by providing dry sprinklers with an integral "flexible" drop tube. U.S. Patent Application Publication No. 2013/0199803 discloses such a "dry" sprinkler. Here, a seal 4 at the inlet end of the drop tube 1 is held in place by pressurized fluid between the seal 4 and a seal 12 at the outlet end of the tube at the sprinkler head. While this arrangement provides some flexibility with respect to installation and fabrication by the installer and manufacturer, the arrangement leaves the end user with a complicated pressure regulation system to maintain to assure that pressure in the flexible tube is held at an adequate level to prevent water leakage through the inlet end seal from the branch supply line.

A different type of dry sprinkler 12 with a flexible drop 14 is disclosed in U.S. Pat. No. 8,887,822. A flexible link 56 is passed through the center of the integral flexible drop 14 between a pivoting valve member such as a clapper 44 and a plug 24 held in the sprinkler outlet of the nozzle 20 by a fusible element 22. The link 56 is sufficiently flexible so as to conform to bending of the flexible drop 14. Activation of the sprinkler by disintegration of the fusible element 22 at the orifice 22 releases the plug 24 and a spring 66 that pulls on one end of the link to remove an opposing end of the link positioned in something called an "X brace valve latch" 54 holding the clapper 44 closed. This sprinkler can be pressurized with appropriate fluid or opened to atmosphere through vent holes 98. However, what is not explained is what assures that the latch 54 will be cleanly released. The latch 54 must slide through the elbow without twisting and remove itself from the path of the clapper 44. Also, internal braces 64 have to be provided at any significant bend of the tube 14 or there is a danger that the flexible link 56 will be allowed to go sufficiently slack so as not to be pulled from the latch when the thermally response element triggers.

U.S. Patent Application Publication No. 2013/0319696 discloses another dry sprinkler 100 with an integral flexible drop tube 3 connecting a threaded inlet 1 and an opposing outlet 2. This is an alternative arrangement to assure that a flexible link 10 extending between an inlet valve assembly 13 and an outlet plug 53 does not go slack from bends in the tube, regardless of where the bends in the tube are located. The sprinkler 100 is activated by collapse of a frangible element 56 retaining the plug 53 and a spacer 45, permitting the spacer 45 to move and pull the link 10, which mechanically fractures a bulb 11 at the inlet end by twisting a collar 36 on the bulb 11. In the one example given in paragraph 38, approximately one-half inch of slack can be taken up by the arrangement.

The designs of dry sprinklers require fabrication precise to within a fraction of an inch of the installed length, even with flexible tubes. Even the dry sprinkler disclosed in U.S. Patent Application Publication No. 2013/0319696 allows only a larger fraction of an inch leeway than the other, previously identified dry sprinklers. As a result, all must be ordered from and fabricated by a manufacturer, at great expense and time to the installer and end purchaser compared with wet sprinkler system installations.

Although U.S. Patent Application Publication No. 2012/0298383 describes the provision of dry sprinklers with flexible tubes (also known as flexible drops) and weep holes, in practice all or nearly all commercially available, flexible-tube-equipped dry sprinklers are provided with a relatively long flexible tube having an equally long inner tube that keeps a seal assembly closed. Under pressure, there is deformation in the flexible tube, and there have been issues with leakage if the flexible tube is used by itself without an inner tube.

Another disadvantage of the flexible drop is that it requires a bracket that has to be connected to the ceiling, so there may be limits to the type of ceiling and structure where the flexible drop can be installed.

If a system could enable installers to fabricate and install, on site, a dry sprinkler equivalent to a wet sprinkler system, without employing custom measured and factory built dry sprinkler assemblies, the system would revolutionize the fire protection industry.

BRIEF SUMMARY OF THE INVENTION

Briefly stated, in a preferred embodiment of the present invention, a thermal trigger assembly is configured for remote mechanical actuation of another fire protection system component. The thermal trigger assembly comprises an activation component including a base and a movable member that is movable with respect to the base. A bias member is located with respect to the base to bias the movable member from a preactivation position with respect to the base to an activated position with respect to the base. A thermally responsive element retains the movable member in the preactivation position until a predetermined thermodynamic condition is reached. The thermally responsive element is configured to lose structural integrity upon the predetermined thermodynamic condition. A blocking member is restrained by the thermally responsive element and retains the movable member in the preactivation position until a loss of structural integrity of the thermally responsive element upon the predetermined thermodynamic condition. A flexible connector includes a flexible hollow outer cable housing with a first end configured to be stationarily connected with the other fire protection system component and a second end configured to be stationarily connected with the base. A flexible inner member is slidably located inside the flexible hollow outer cable housing for sliding movement within the other cable housing and has a first end and a second end. The second end is configured to be stationarily connected with the movable member so as to be moved with respect to the flexible hollow outer cable housing by a movement of the movable member with the loss of structural integrity by the thermally responsive element upon the predetermined thermodynamic condition.

In another aspect, in a preferred embodiment of the present invention, a dry sprinkler device comprises a valve. The valve has a body with an inlet, at least one outlet, and a fluid passageway connecting the inlet with each outlet. A seal member is supportable across the passageway to close the passageway by a pivotally mounted lever. The seal member is supported across the passageway in a sealing position by a latch releasably engaged with the lever. An activation component includes a base and a movable member that is movable with respect to the base. A bias member is located with respect to the base to bias the movable member from a preactivation position with respect to the base to an activated position with respect to the base. A thermally responsive element retains the movable member in the preactivation position until a predetermined thermodynamic condition is reached. The thermally responsive element is configured to lose structural integrity upon the predetermined thermodynamic condition. A blocking member is restrained by the thermally responsive element and retains the movable member in the preactivation position until a loss of structural integrity of the thermally responsive element upon the predetermined thermodynamic condition. A flexible connector includes at least a flexible hollow outer cable housing with a first end configured to be stationarily connected with the other fire system component and a second end configured to be stationarily connected with the base. A flexible inner member is slidably located inside the flexible hollow outer cable housing for sliding movement within the outer cable housing. The flexible inner member has a first end and a second end. The second end is configured to be stationarily connected with the movable member so as to be moved with respect to the flexible hollow outer cable housing by a movement of the movable member with the loss of structural integrity by the thermally responsive element upon the predetermined thermodynamic condition. At least one water distribution device is fluidly coupled with the at least one outlet.

In another aspect, a preferred embodiment of the present invention is a method of providing a dry sprinkler device. The method comprises the steps of: connecting an inlet of a valve to a branch water line; mechanically connecting an activation component with a thermally responsive element to the valve with a Bowden cable so as to open the valve in response to a loss of physical integrity of the thermally responsive element; and fluidly connecting a water distribution device to an outlet of the valve to spray water received from the valve. The activation component includes a base and a movable member movable with respect to the base. A bias member is located with respect to the base to bias the movable member from a preactivation position with respect to the base to an activated position with respect to the base. A thermally responsive element retains the movable member in the preactivation position until a predetermined thermodynamic condition is reached. The thermally responsive element is configured to lose structural integrity upon the predetermined thermodynamic condition. A blocking member is restrained by the thermally responsive element and retains the movable member in the preactivation position until a loss of structural integrity of the thermally responsive element upon the predetermined thermodynamic condition.

In another aspect, a preferred embodiment of the present invention is a method of installing a dry sprinkler device. The dry sprinkler device includes a valve, an activation component with a thermally responsive element, and a flexible Bowden cable. The Bowden cable mechanically couples the activation component with the valve so as to open the valve in response to a loss of physical integrity of the thermally responsive element. The method comprises the steps of: fluidly coupling an inlet of the valve with a water supply line; installing a water distribution device at a location spaced apart from the valve and connecting the device with an outlet of the valve through intermediate piping; and installing the activation component at a location spaced apart from the valve. The valve is operatively connected with the activation component through the Bowden cable. The activation component includes a base and a movable member that is movable with respect to the base. A bias member is located with respect to the base to bias the movable member from a preactivation position with respect to the base to an activated position with respect to the base. A thermally responsive element retains the movable member in the preactivation position until a predetermined thermodynamic condition is reached. The thermally responsive element is configured to lose structural integrity upon the predetermined thermodynamic condition. A blocking member is restrained by the thermally responsive element and retains the movable member in the preactivation position until a loss of structural integrity of the thermally responsive element upon the predetermined thermodynamic condition.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
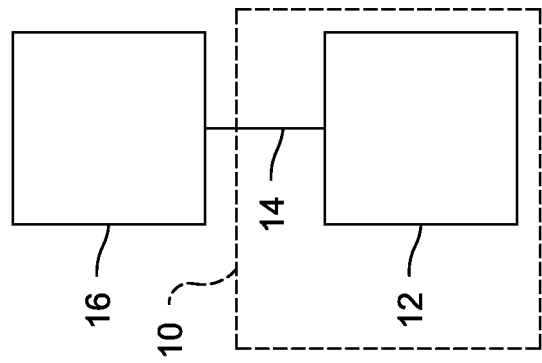
FIG. 1 is a diagrammatic view of a thermal trigger assembly of the present invention including an activation component connected with another fire sprinkler system component via a flexible connector in accordance with the invention.

Certain terminology is used in the following description for convenience only and is not limiting. The words "lower," "bottom," "upper," "top," "front," "back," and "rear" designate directions in the drawings to which reference is made. The words "inwardly" and "outwardly" refer to directions toward and away from, respectively, the geometric center of the component being discussed, and designated parts thereof, in accordance with the present disclosure. Unless specifically set forth herein, the terms "a," "an," and "the" are not limited to one element, but instead should be read as meaning "at least one." The terminology includes the words noted above, derivatives thereof, and words of similar import.

As shown in FIG. 1, in a block diagram of a preferred embodiment of the present invention, a thermal trigger assembly 10 is configured for remote mechanical actuation of another fire protection system component 16. The thermal trigger assembly 10 includes an activation component 12 and a flexible connector 14 configured to allow the activation component 12 to remotely mechanically actuate another fire protection system component 16, which in some preferred embodiments (discussed below) is a valve 26 with an inlet 25 and one or more outlets 27 for discharging a fluid, generally water, into one or more sprinklers, a switch or a relay (not shown) having a throw, a magnet (such as a Reed switch or relay) or an equivalent that can be mechanically moved, or another type of fire-protection system device actuatable by a mechanical input.

Figure 2:
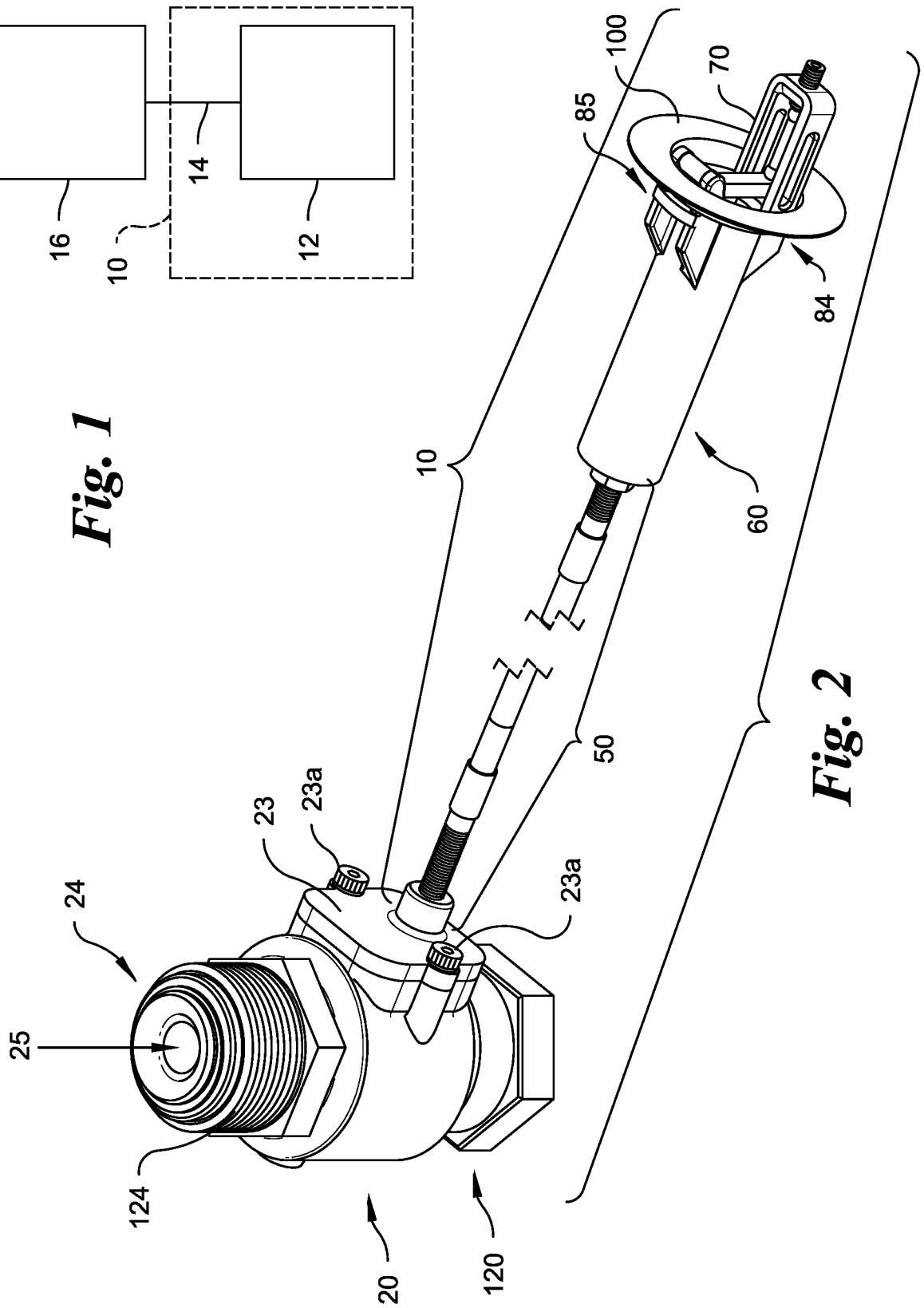
FIG. 2 is a perspective view of an activation component of a trigger assembly connected with another fire sprinkler system component, a valve, via a flexible connector of the assembly in accordance with a preferred embodiment of the invention, to provide a preaction valve assembly.

In another preferred embodiment, as shown in FIGS. 2-8 a thermal trigger assembly 10 includes an activation component 60 and a flexible connector 50 configured for remote mechanical actuation of another fire protection system component, which as depicted in FIG. 2 is a valve 20. Alternatively, and not specifically illustrated in the present application, the other fire protection component may include a switch or a relay.

Figure 3:
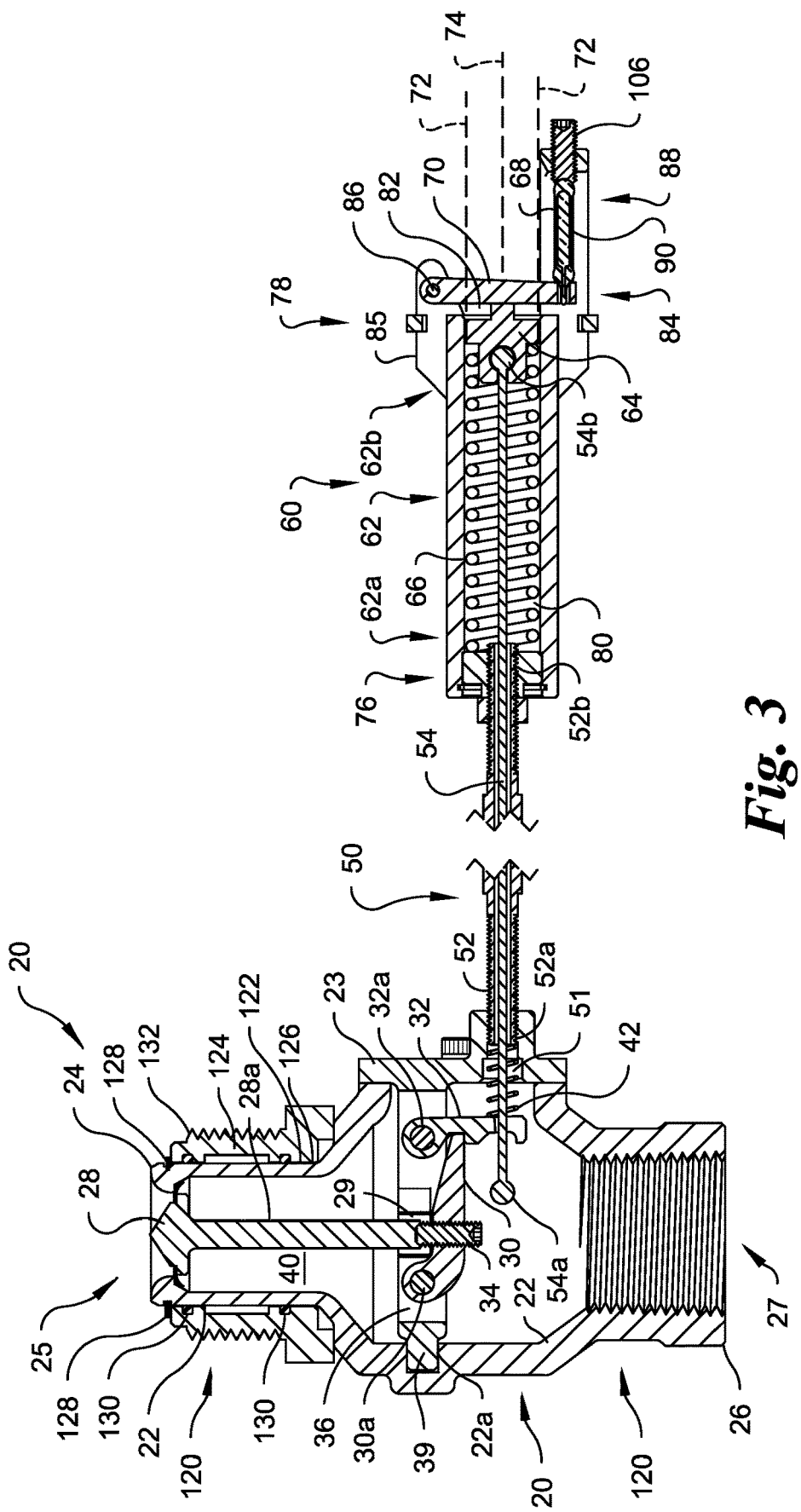
FIG. 3 is a cross-sectional view of the assembly of FIG. 2, with the exception of deleting an optional trim ring 100, prior to activation of the device.
Figure 4:
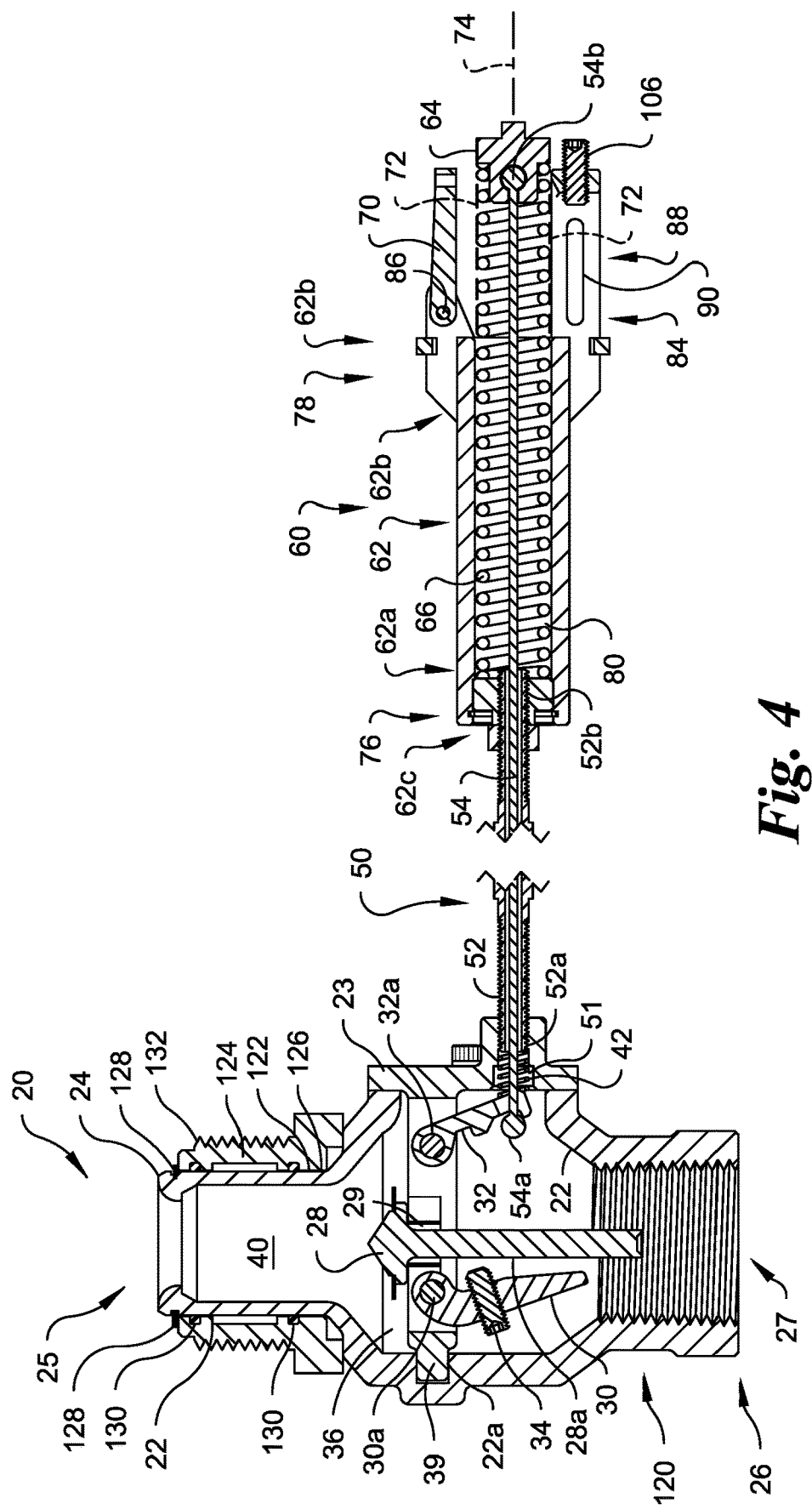
FIG. 4 is a cross-sectional view of the assembly of FIG. 3, shown following activation of the assembly.

Certain details of the valve 20, a poppet-type valve, and of the flexible connector 50 and the activation component 60 of the thermal trigger assembly, are shown in FIGS. 2-4. Note that other types of valves may be substituted for the valve 20, including, but not limited to, clapper valves and valves with multiple outlets. The thermal trigger assembly 10 includes an activation component 60 having a base 62 and a movable member 64 that is movable (preferably translatable) with respect to the base 62. The base 62 of the activation component 60 has a longitudinal axis 74, a proximal end 76, a distal end 78, a cavity 80 oriented essentially parallel to the longitudinal axis and housing a bias member 66, a distal opening 82, and an extension made up of two extension legs 84 and 85 extending distally from the base 62 beyond the distal opening 82. A thermally responsive element 68 is supported by the extension, which is any structure or portion of a structure that extends distally from the base 62 beyond the distal opening 82. The thermally responsive element 68, which is illustrated as an alcohol-filled glass bulb, may alternatively take the forms of other thermally responsive elements, such as other liquid-filled glass bulbs, bi-metallic disks, fusible links, and other solder-based links or assemblies (not shown) which fail in response to being heated sufficiently to at least a predetermined temperature, permitting movement to occur.

The bias member 66 is located with respect to the base 62—in this example, in the cavity 80—to bias the movable member 64 to move distally (toward the right when viewing FIG. 2) from a preactivation position, shown in FIG. 3, with respect to the base 62 to an activated position, shown in FIG. 4, with respect to the base 62. The bias member 66, which is initially in a compressed state (FIG. 2), is selected to generate a force sufficient to overcome any frictional or other forces opposing movement of the movable member 64. The thermally responsive element 68 retains the movable member 64 in the preactivation position (as discussed below) until a predetermined thermodynamic condition is reached. The thermally responsive element 68 is configured to lose structural integrity upon the predetermined thermodynamic condition. The activation component 60 optionally may include a switch (not shown) mounted on the activation component 60 so as to change states with a movement of the movable member 64.

A blocking member 70 is restrained by the thermally responsive element 68. The blocking member 70 initially retains the movable member 64 in the preactivation position until a loss of structural integrity of the thermally responsive element 68 upon the predetermined thermodynamic condition.

The movable member 64 moves along a path of movement 72, shown in dashed lines in FIGS. 3 and 4. The thermally responsive element 68 is offset from the path of movement 72. As a result, the thermally responsive element 68 preferably does not obstruct the path of movement 72, of the moveable member 64 and the distance moved by the movable member 64 is not limited by the size of the thermally responsive element 68. The extension leg 85 comprises a fulcrum 86 engaging one end of the blocking member 70 so that with the loss of structural integrity of the thermally responsive element 68, the blocking member 70 undergoes a motion comprising pivoting counterclockwise about the fulcrum 86, with such motion in some embodiments comprising a combination of pivoting about the fulcrum 86 and sliding or otherwise moving with respect to the fulcrum 86. In the embodiment shown, the blocking member 70 is pivotally mounted to pivot about the fulcrum 86 via a shaft 102 (FIG. 8); but alternatively, as shown in FIG. 9, the blocking member 70 simply rests against the fulcrum 86 and is held in place by a force applied by the movable member 64. In the embodiment of FIG. 9, the movement of the blocking member 70, upon the loss of structural integrity of the thermally responsive element 68, is generally a combination of sliding and rotation with respect to the fulcrum 86.

Figure 5:
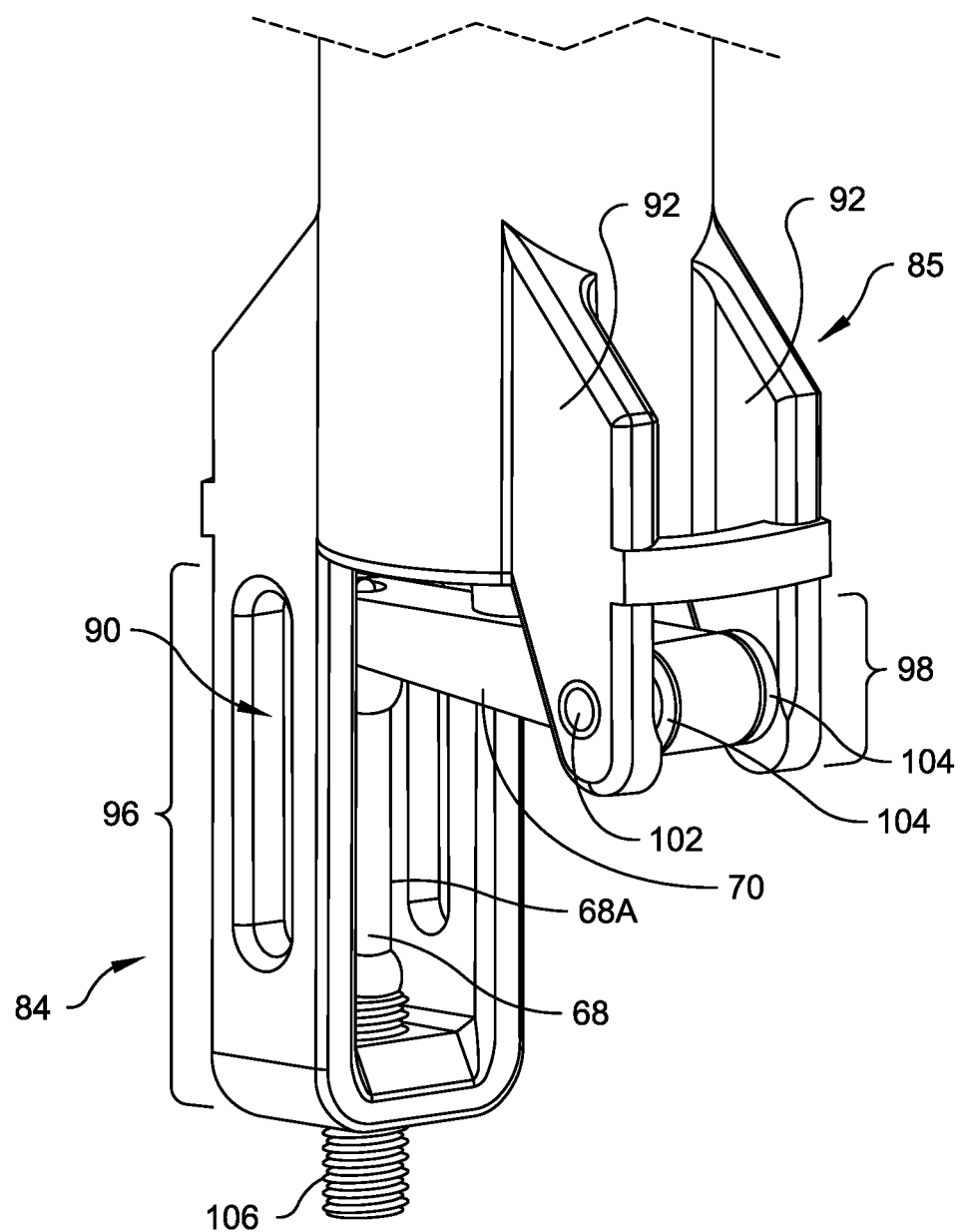
FIG. 5 is a magnified partial perspective view of the assembly of FIG. 3, showing a portion of the activation component.
Figure 6:
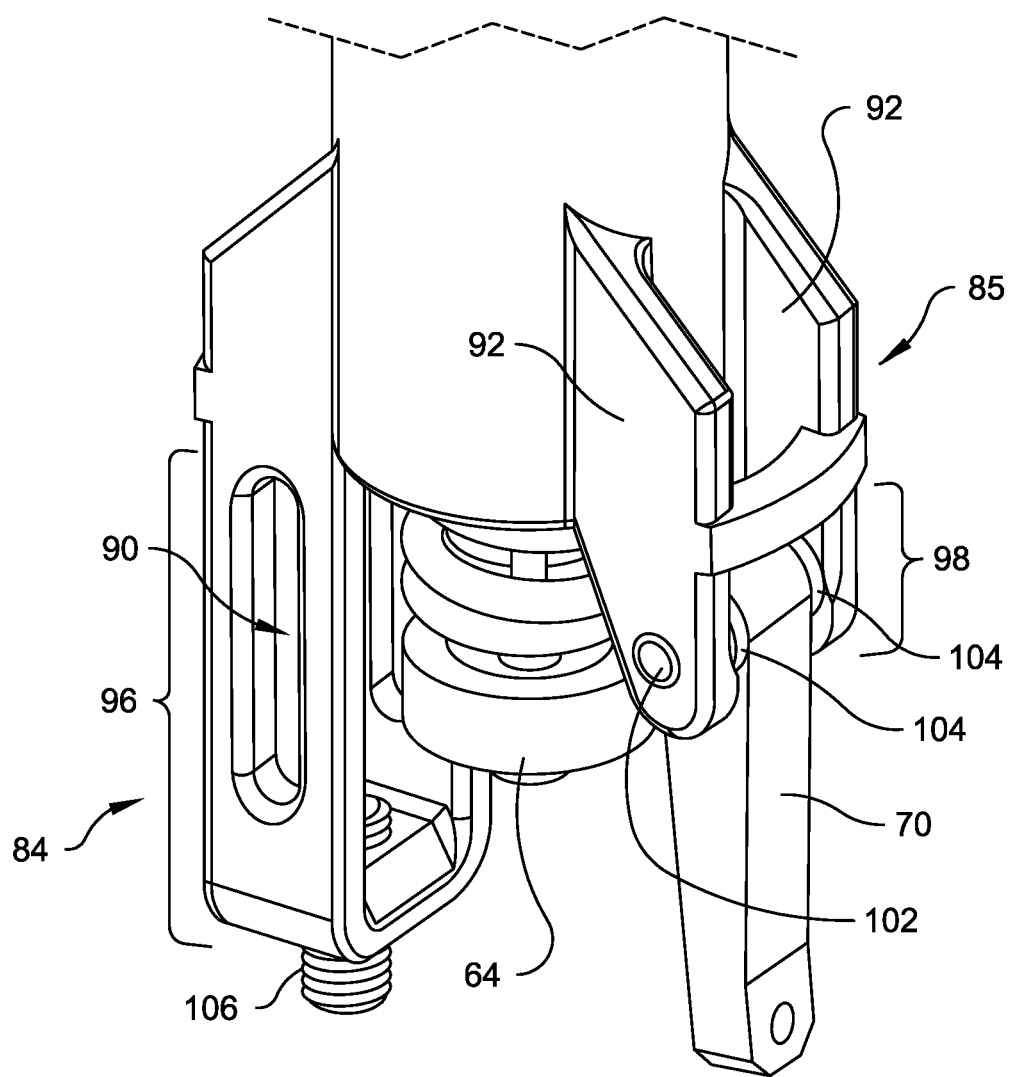
FIG. 6 is a magnified partial perspective view of the assembly of FIG. 3, showing a portion of the activation component.
Figure 7:
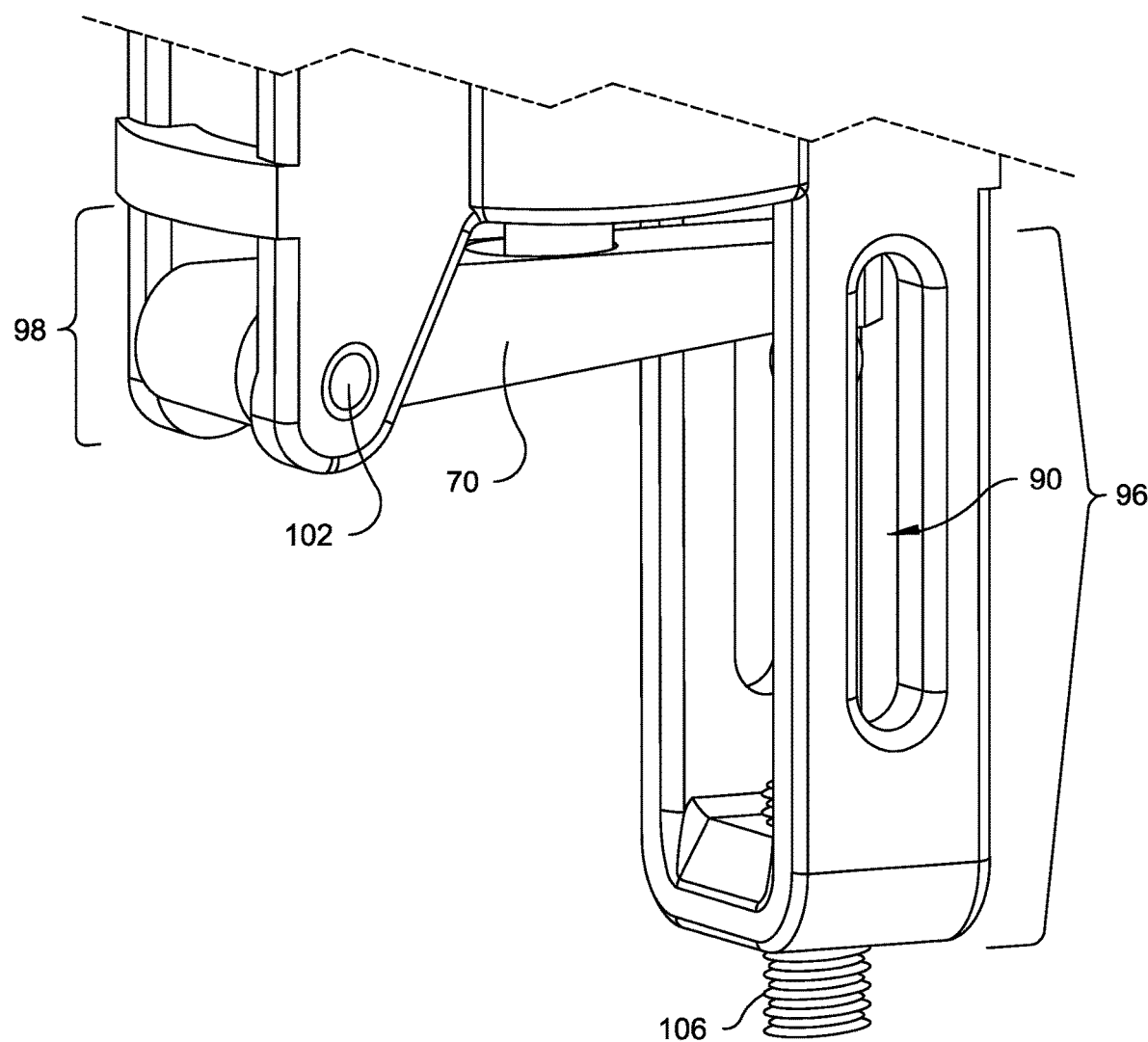
FIG. 7 is a magnified partial perspective view of the assembly of FIG. 3, showing a portion of the activation component.

The extension leg 84 comprises an enclosure 88 for the thermally responsive element 68, and the enclosure 88 includes an opening 90 permitting a surrounding atmosphere to contact the thermally responsive element 68. Referring to FIG. 5, a periphery 68a of the thermally responsive element 68 is located inwardly from the opening 90 to reduce the probability of inadvertent breakage of the thermally responsive element 68—for example, during transport or installation.

Figure 8:
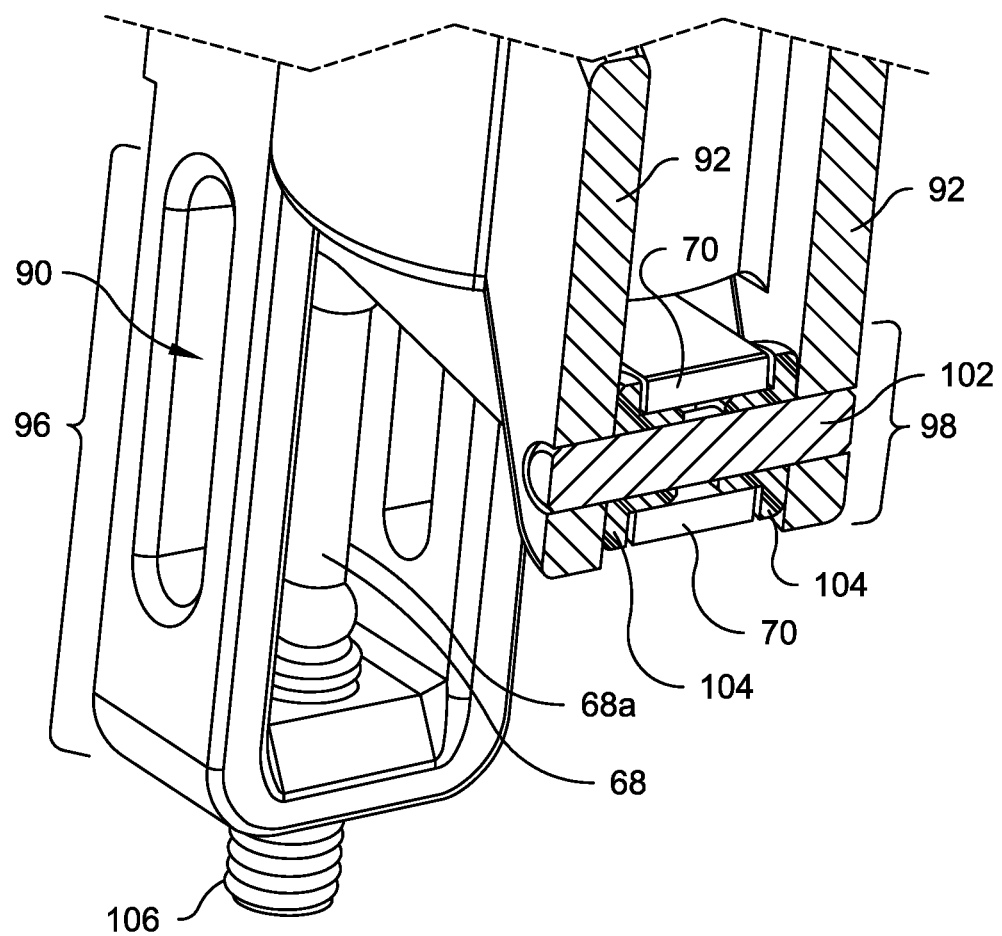
FIG. 8 is a magnified partial sectional and perspective view of the assembly of FIG. 3, showing a portion of the activation component.
Figure 9:
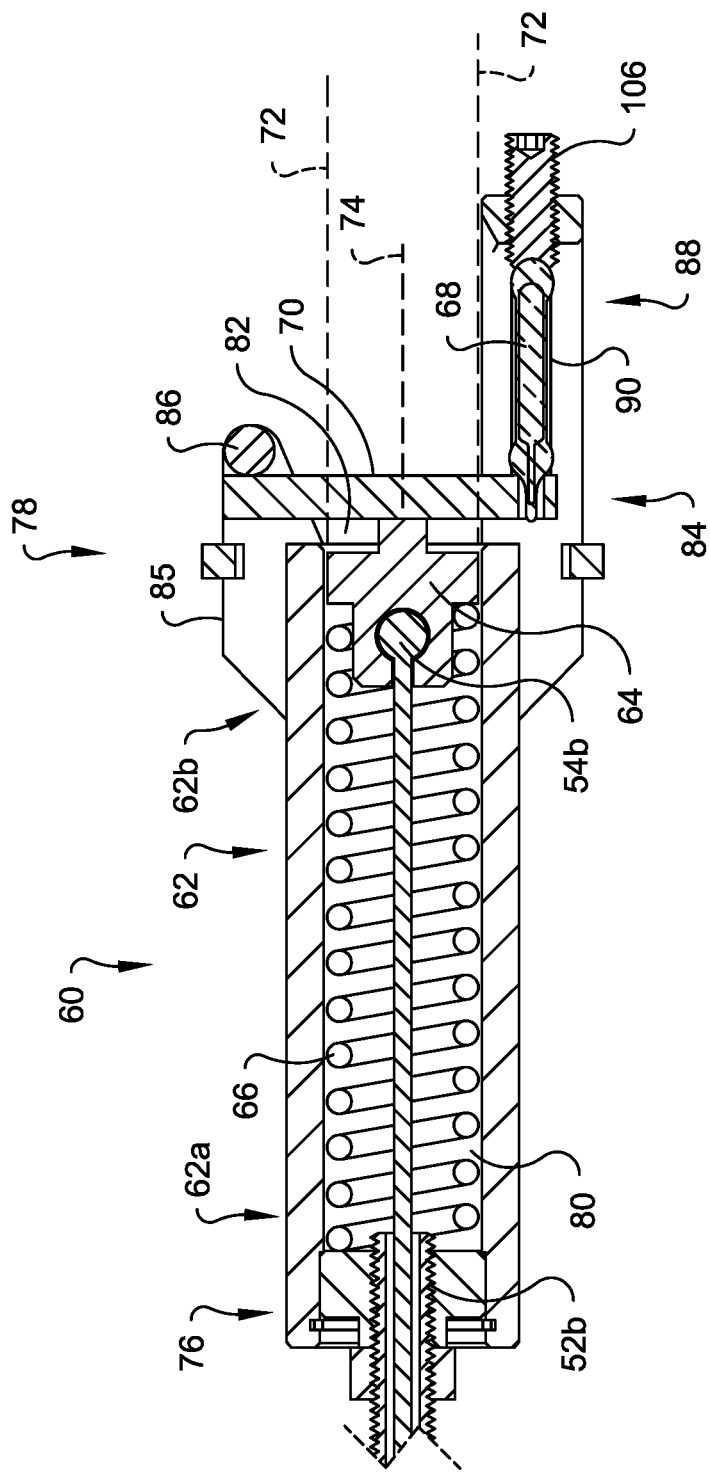
FIG. 9 is a magnified partial sectional and perspective view of an alternative activation component for use in the assembly of FIG. 3.

Referring to FIGS. 5-8, the extension leg 85 comprises two-parallel plates 92. Referring to FIG. 8, a transverse fulcrum member comprises the shaft 102 and two bushing members 104 mounted upon the shaft 102. The bushing members 104 preferably comprise a corrosion-resistant material—for example, the bushing members may be formed from, coated with, or embedded with such a material. In certain embodiments, the corrosion-resistant material comprises polytetrafluoroethylene. The blocking member 70 is pivotally attached to the extension via the extension leg 85 and, in the embodiment shown, the blocking member 70 is a lever mounted upon the shaft 102. The extension leg 84 comprises a thermally responsive element portion 96 including the enclosure 88, and the extension leg 85 comprises a fulcrum portion 98 including the fulcrum 86. In the embodiment shown, the thermally responsive element portion 96 extends farther distally than the fulcrum portion 98. The thermal trigger assembly 10 optionally further comprises a trim ring 100 (see FIG. 2) engaging the extension 84 and configured to engage a surface through which the thermal trigger assembly 10 is mounted.

Referring to FIGS. 2-4, the flexible connector 50 includes a flexible hollow outer cable housing 52 with a first end 52a configured to be stationarily connected with the other fire protection system component, which in the illustrated embodiment is a valve 20, and a second end 52b configured to be stationarily connected with the base 62 of the thermal trigger assembly 10. In some embodiments, the flexible connector is a Bowden cable as depicted herein; but the flexible connector may include other flexible members for transmitting force between the valve 20 and the activation component 60. Optionally the first end 52a of the flexible hollow outer cable housing 52 may be configured for fixed connection with the other fire protection component, here the valve 20, and the first end 54a of the flexible inner member 54 may be configured for mechanical connection with a movable part of the other fire protection component, such as the valve 20. The base 62 includes an upper, spacer portion 62a from which extends a sensing portion 62b. The base 62 is shown as a single piece but may also be made of an assembly of joined parts.

Referring to FIGS. 3 and 4, the flexible connector 50 includes a flexible inner member 54 with opposing first end 54a and second end 54b. The flexible inner member 54 may be a cable, flexible tube, flexible wire, or other flexible body with sufficient longitudinal stiffness to sustain the applied forces without deformation compromising the ability of the flexible inner member to transmit motion from the movable member 64 to the other fire protection component such as the valve 20. The flexible inner member 54 is slidably located inside the flexible hollow outer cable housing 52 for sliding movement within the outer cable housing 52. The second end 54b of the flexible inner member 54 is configured to be stationarily connected with the movable member 64 so as to be moved with respect to the flexible hollow outer cable housing 52 by a movement of the movable member 64 with the loss of structural integrity by the thermally responsive element 68 upon the predetermined thermodynamic condition.

FIGS. 3 and 4 depict an exemplary embodiment, shown in both a preactivation position and an activated position, which follows a loss of structural integrity of the thermally responsive element 68. As depicted, the valve 20 is a poppet valve, but as noted above, any fire protection system component actuatable by a mechanical movement—for example, a clapper valve or a switch—may be used in a system, along with certain components of the devices disclosed herein. The valve 20 has a body 22 with an inlet end 24 externally threaded to be received in a Tee in or a threaded pipe from a wet supply line (not shown) and an outlet end 26 internally threaded to receive an externally threaded length of piping. The valve 20 has an inlet 25 and an outlet 27. In some embodiments (not shown) the valve 20 may have two or more outlets 27 connected with the inlet 25 by a fluid passageway 40. A seal member 28 is supportable across the passageway 40 to close the passageway 40 by a pivotally mounted lever 30. The seal member 28 is retained in a sealing position by a pivotally mounted latch 32 engaged with one end of the lever 30. An adjustment screw 34 is preferably provided in the lever 30 to vary the mechanical compression provided on the seal member 28. Two parallel cross-members, of which one cross-member 36 is shown, span the passage 40 of the body 22 and terminate in a pin 39 received in a bore 22a in an inner side wall of the body 22 distal to a removable cover 23. The cross members, including the cross member 36, support pivots for the lever 30 and the latch 32. A hollow boss 29 is formed between cross members, including the cross member 36, and slidably receives the shaft portion 28a of the seal member 28. A bias member, for example, a compressed coil spring 42 biases the latch 32 into releasable engagement with the lever 30. The first end 54a of the flexible inner member 54 is mechanically coupled with the latch 32 for movement of the latch 32 with respect to the lever 30 by a movement of the first end 54a of the flexible inner member 54. The latch 32 pivots around a latch pivot 32a, which is a pinned connection. Similarly, the lever 30 pivots around a lever pivot 30a, which is also a pinned connection The latch 32 is adapted to connect with the first end 54a of the flexible inner member 54 of the flexible connector 50, while a port 51 is provided in the cover 23 for receiving a first end 52a of an outer cable housing 52 of the flexible connector. The cover 23 is secured by two screws 23a (FIG. 2).

In the embodiment shown in FIGS. 2-4, the valve body preferably has an outlet portion 120 (see FIGS. 3 and 4) comprising the outlet end 26 and the outlet 27. The valve body 22 preferably also has an engagement surface 122 (FIGS. 3 and 4) on the inlet end 24. The combination further comprises a swivel nut 124 having an inner surface 126 fittable to the engagement surface 122 and forming a watertight seal with the engagement surface 122, and a retaining member 128 protruding from the valve body 22 and engaging the swivel nut 124 to restrain a downward movement of the valve body 22 with respect to the swivel nut 124. The swivel nut 124 preferably comprises a seal member, which may take the form of an O-ring 130 as shown in FIGS. 3 and 4, forming the watertight seal. The illustrated embodiment also includes a second seal member and, as shown, includes two O-rings 130. In the exemplary embodiment shown, the swivel nut 124 is externally threaded (with threaded portion 132) for connection to a pipe (not shown). Alternatively, the swivel nut 124, the engagement surface 122, and the retaining member 128 may be omitted and replaced with external threads, as shown in, for example, FIGS. 4, 5, 7, and 12-18A of U.S. patent application Ser. No. 15/222,770 filed Jul. 28, 2016 and published as U.S. Pat. App. Pub. No. 2017/0028238 on Feb. 2, 2017, of which the present application is a continuation-in-part.

The second, opposing, remaining end 54b of the flexible inner member 54 of the flexible connector 50 is configured to be stationarily connected with the movable member 64 so as to be moved with respect to the flexible hollow outer cable housing 52 by a movement of the movable member 64.

Operation of the valve component 20 by means of the thermal trigger assembly 10 is straight forward. The valve component 20 is installed in the configuration of FIG. 2. When the thermally sensitive element 68 is heated to a predetermined thermodynamic condition to break, the blocking member 70 is released allowing the movable member 64 to move along the path of movement 72. The initially compressed bias member 66 is selected to generate a force sufficient for overcoming the bias of the coil spring 42 and pivot the latch 32, (counterclockwise) and out of engagement with the lever 30. Other bias members known in the art may by substituted for the coil spring 42. The pressure of fluid at the inlet 25 forces the seal member 28 and the lever 30 back away from the inlet 25 and into the central chamber 40, permitting water or other fluid to flow past the lever 30 and the latch 32 and through the outlet 27.

The thermal trigger assembly of the invention, configured as shown in FIGS. 2-9, controls water flow to at least one water distribution device, which may take the form of an automatic fire sprinkler with a thermally responsive element and a plug, or an open fire sprinkler lacking a thermally responsive element and plug. A significant advantage of this invention applies to a conventional automatic sprinkler that has been certified by a testing laboratory. A certified automatic sprinkler, when installed open, without a thermally responsive element or plug in the sprinkler itself, and in combination with a preaction valve assembly formed by the thermal trigger assembly 10 and the valve 20, can become a certified equivalent of a dry sprinkler. Normally, any new dry sprinkler must pass a complete UL199, FM2000, or other certification program, which includes tests such as distribution, corrosion, and a long litany of other tests, possibly including very expensive fire tests. The benefit of the preaction valve assembly formed by the thermal trigger assembly 10 with the valve 20 is that it can be assembled together with any laboratory-certified open sprinkler. Only a minimum number of certification tests of the previously approved automatic sprinkler in combination with the preaction valve assembly should be required for approval of the assembly as a dry sprinkler device.

In another aspect, a preferred embodiment of the present invention is a method of providing a dry sprinkler device. The method comprises the steps of assembling a device within the class of devices of which exemplary devices are depicted in FIGS. 2-9. The method includes the following steps: connecting an inlet 25 of a valve 20 to a branch water line; mechanically connecting an activation component 60 with a thermally responsive element 68 to the valve 20 with a Bowden cable (flexible connector 50) so as to open the valve 20 in response to a loss of physical integrity of the thermally responsive element 20; and fluidly connecting a water distribution device to an outlet 27 of the valve 20 to spray water received from the valve 20. The activation component 60 includes a base 62 and a movable member 64 movable with respect to the base 62. A bias member 66 is located with respect to the base 62 to bias the movable member 64 from a preactivation position (FIG. 3) with respect to the base 62 to an activated position (FIG. 4) with respect to the base 62. A thermally responsive element retains 68 the movable member 64 in the preactivation position until a predetermined thermodynamic condition is reached. The thermally responsive element 68 is configured to lose structural integrity upon the predetermined thermodynamic condition. A blocking member 70 is restrained by the thermally responsive element 68 and retains the movable member 64 in the preactivation position until a loss of structural integrity of the thermally responsive element 68 upon the predetermined thermodynamic condition. The thermally responsive element 68 is supported by a threaded movable support 106, which provides the ability to adjust for the length of the thermally responsive element 68.

In another aspect, a preferred embodiment of the present invention is a method of installing a dry sprinkler device. The dry sprinkler device includes a valve 20, an activation component 60 with a thermally responsive element 68, and a flexible Bowden cable (flexible connector 50). The Bowden cable mechanically couples the activation component 60 with the valve 20 so as to open the valve 20 in response to a loss of physical integrity of the thermally responsive element 68. The method comprises the steps of:

fluidly coupling an inlet 25 of the valve 20 with a water supply line; installing a water distribution device at a location spaced apart from the valve 20 and connecting the device with an outlet 27 of the valve 20 through intermediate piping; and installing the activation component 60 at a location spaced apart from the valve 20. The valve 20 is operatively connected with the activation component 60 through the Bowden cable. The activation component 60 includes a base 62 and a movable member 64 that is movable with respect to the base 62. A bias member 66 is located with respect to the base 62 to bias the movable member 64 from a preactivation position (FIG. 3) with respect to the base 62 to an activated position with respect to the base 62. A thermally responsive element 68 retains the movable member 64 in the preactivation position until a predetermined thermodynamic condition is reached. The thermally responsive element 68 is configured to lose structural integrity upon the predetermined thermodynamic condition. A blocking member 70 is restrained by the thermally responsive element 68 and retains the movable member 64 in the preactivation position until a loss of structural integrity of the thermally responsive element 68 upon the predetermined thermodynamic condition.

The ability to displace the activation component 60 from the sprinkler head or other device being controlled 16 (FIG. 1) permits the advantageous location of the activation component 60 at an optimal location for fire identification and response and placement of the connected sprinklers or other fire protection devices at optimal location for water distribution and/or coverage.

The activation component 60 of the present invention has the thermally responsive element 68 offset from the path of movement 74 of the movable member 64. As a result, the distance through which the movable member 64 moves is not limited by the dimensions of the thermally responsive element 68. The first end 54a is preferably initially positioned at a short distance from the latch 32 (see FIG. 3), with the activation component 60 being more resistant to accidental triggering than if the first end 54a is initially positioned in contact with the latch 32. Therefore, the activation and device 60 of the illustrated embodiment of the present invention is suited to situations requiring a greater movement of the flexible inner member 54 than may be provided by other similar devices, such as those disclosed in U.S. Pat. App. Pub. No. 2017/0028238A1.

Another possible use of the devices of the present invention is the provision of fire protection in attics of wood construction and other combustible concealed areas without or with obstructions.

Many embodiments of the invention offer a number of possible sprinkler options that were heretofore not available or unlikely to pass fire tests for attic use. The activation component of the present inventive system can be located at the peak of a roof, or wherever is optimum for the detection of heat from a fire most quickly for most rapid activation, while the sprinkler head(s) connected with the activation component through a valve component can be located wherever provides the best protection or installation—at the peak, away from the peak and/or away from the pitch—to obtain optimum water distribution and/or to be located closer to any potential source of fire.

Embodiments of the present invention enable the installation of any and all types of conventional sprinkler heads (pendent and sidewall, as well as upright and standard spray) in these locations, albeit in an open configuration without a plug or thermally responsive element. The provision of the present invention further enables the development of other new concept spray distribution methods and sprinkler heads suitable for such application(s). Moreover, it is expected that conventional automatic sprinkler heads will be installable according to their maximum listed coverage areas (or at least greater than one-hundred and thirty square feet if their normal, listed coverage area exceeds one-hundred and thirty square feet) and without hydraulic demand penalties currently imposed on conventional automatic sprinklers used in attics and other combustible concealed installations. The open sprinkler heads connected to a valve component of the present invention are also able to be pitched from the vertical to enhance their throw patterns, if necessary or desirable. It also provides the opportunity to use even less water than now required since embodiments of the invention provide optimum placement of the activation component for activation, as well as optimum placement of the spray sprinklers for fire protection because the functions are separated rather than being provided by a single device in the manner of a standard sprinkler.

These advantages are available in sprinkler systems installed in yet other "problem areas." So, the provision of the present invention enables the installation of a dry attic sprinkler system while employing conventional automatic sprinkler heads that are open. The valve component can be located in a heated or other non-water-sensitive area spaced away from a cold/water-sensitive area where the activation component and heads can be located. Alternatively, water can be provided to a preaction valve assembly of the invention located in a cold/water-sensitive area by the provision of a dry valve located upstream in a heated/non-water-sensitive area where the distance between the heated/non-water-sensitive area and the activation component is greater than the length of the flexible connector of the preaction valve assembly.

Finally, the provision of sprinkler heads fed by a valve component of the present invention permits the optimum location of the heads to attack a fire with a discharge of water sufficiently quickly and sufficiently close to the fire source to enable the passage of laboratory fire tests with delivered water densities of less than 0.1 GPM/sq.ft of coverage area, which is currently the required minimum.

Another application is the fire protection of a truck loading dock that is under freezing conditions. The thermal trigger assembly of the present invention replaces a very expensive and complicated dry sprinkler system by allowing the use of existing approved open conventional sprinklers installed in the freezing area and installing the valve component in a heated area. This concept allows the reduction of ordinary hazard water densities to be lowered to light hazard requirements (over 50% less water) because of the speed and strategic positioning allowed by the invention.

The thermal trigger assemblies and the dry sprinkler device variations of the present invention offer numerous advantages over conventional dry sprinklers.

All known dry sprinklers have to be sized for a particular installation to within a fraction of an inch in length. All known dry sprinklers are not designed for length adjustment of any kind in the field or, at most, are designed for only the most minimal length adjustment in the field]. Consequently, all have to be made to some measured length at a factory and not in the field by the installer. In addition to the time mentioned earlier to custom fabricate each sprinkler at the factory and the potential problem of measurement or fabrication length errors, the custom sprinklers have to be shipped to the installer and may be damaged in transit.

The maximum length/height of commercially available dry sprinkler heads is four feet, which establishes the maximum distance from a wet, water supply line. Thermal trigger assemblies of the present invention can be supplied with flexible connectors having a single given maximum length greater than or equal to four feet or in different lengths, for example in integer or two or three foot increments. Any of these options represents significant savings and installation versatility compared to custom length, conventional dry sprinklers.

Conventional automatic sprinkler heads—that it, sprinkler heads that are testing laboratory approved and listed for NFPA 13—can be installed with the subject thermal trigger assemblies and preaction valves of the invention, in the field, at the same time the rest of the fire sprinkler system is being installed. The installer simply cuts or assembles a length of pipe (i.e. the drop) on the job as he would with a conventional wet sprinkler system and attaches a conventional open or automatic sprinkler head to the drop. The installer can finish the system installation with no delay or special procedures. Fire protection is immediately available while the rest of the trades finish construction, whereas with conventional dry sprinkler systems there would be no protection until after the specially ordered, conventional dry sprinklers were installed, days and even weeks after the supply piping is installed.

Being able to install any conventional automatic sprinkler head into a dry sprinkler device is itself a significant advantage. In addition to specific lengths, installers of conventional dry sprinkler systems have to specify other characteristics to order conventional dry sprinklers, including orientation (sidewall, upright or pendent and, if pendent, exposed, recessed or hidden), operating temperature, orifice size, finish and/or color. There are many hundreds if not thousands of different conventional automatic sprinkler heads available from a variety of manufacturers that can be used, off the shelf, with valve components of the present invention to satisfy the thousands of potential combinations of these characteristics. Since only the valve components of the dry sprinkler devices of the present invention need approval from the recognized testing laboratories, it is possible to install virtually any conventional automatic sprinkler head (open or plugged) with a valve component of the present invention, without limitation, to provide a dry system.

While there are many hundreds if not thousands of possible different characteristic combinations for fire sprinklers, and many manufacturers willing to commercially supply those combinations in automatic sprinkler heads, they will only supply no more than about one-tenth of those characteristic combinations in dry sprinklers because each dry sprinkler must be tested independently by the approving labs as to operation, corrosion, and other performance characteristics. With each dry sprinkler costing more than $50,000 to be tested for approval by one of the recognized testing laboratories, manufacturers limit the varieties of dry sprinklers available because the market is not so big as to justify those approval expenses for the full range of available wet system sprinkler heads. Once approved, the preaction valve with thermal trigger assemblies of the present invention will instantly allow virtually every laboratory approved conventional automatic sprinkler head of every manufacture to be installed as a dry sprinkler device. This gives sprinkler system designers, building owners, and installers a virtually unlimited choice of sprinkler heads to use that will also save installation costs.

Since the valve components of the present invention can be mechanically tripped, they can be further be configured or accessorized to be separately remotely tripped, automatically or on demand.

Thermal trigger assemblies of the present invention can be configured to automatically trip at a temperature below, above, or equal to the rated temperature of the connected automatic (i.e. plugged) sprinkler head(s) by selection of the operating temperature of the thermally responsive element 68 of the activation component 60 to be lower or higher compared to that of the corresponding sprinkler head. Thus, it is possible to preload a sprinkler head with water prior to activation, if desired, or delay loading of the sprinkler head until after it has opened.

When used to provide a two-step activation, thermal trigger assemblies of the present invention also give superior protection against vandalism or accidental damage, false trips or faulty sprinklers, and water damage—a major concern of both insurance companies and building owners. If a sprinkler is damaged prior to normal activation—for example, a bulb or other thermally responsive element breaks or is accidentally broken, or is defective (i.e. permits leak)—no water will be released since the "independent" activation component 60 of the present invention is not triggered by damage to the sprinkler. Not only does this prevent water damage from unintended activation, it allows immediate field repair without removing the system from protective service and without having to wait for a factory manufactured replacement assembly. The system can be fully repaired, in the field, like a conventional wet system. (Maintaining an active system during head repairs has been notoriously very expensive, with sophisticated equipment required.)

If the thermal trigger assembly of a system with automatic (i.e. plugged) sprinkler heads is configured to open the valve component before sprinkler activation, fire protection is improved because there is no air to escape before the water flows from the sprinkler heads. The valve component prefills the sprinkler heads before conditions reach the activation temperature of the sprinkler heads.

A preaction valve with thermal trigger assembly of the present invention potentially allows plastic piping to be used as drops in areas that would have normally required dry sprinklers, provided that the valve component can be located in an area protected from and/or otherwise not subjected to freezing temperatures. This represents a tremendous savings in installation time and costs, particularly in those residential and light hazard systems otherwise amenable to plastic pipe installation throughout. The assemblies can be configured by selection of the thermally responsive elements 68 to operate at a temperature above that at which the thermally responsive elements used in any automatic (i.e. plugged) sprinklers activate to assure there will be no water inside the drop or pressurization of the drop until the thermally responsive elements, 68 of both the activation component 60 and the sprinkler have reached their respective activation temperatures.

If the activation component 60 trips from breakage of the thermally responsive element 68 or its equivalent, but the corresponding automatic (i.e. plugged) sprinkler does not activate, the exposed portion of the activation component 60 will provide a visual indication below the ceiling that the activation component 60 has tripped and that water is in a potentially freezing area. If the sprinkler leaks, dripping of water will provide a secondary indication of caution that the drop pipe is full of water and should be serviced.

In addition to providing a very economical alternative to compressed gas and antifreeze "dry" sprinklers, thermal trigger assemblies of the present invention can further present the possibility of economical dry residential sprinkler systems, with two-stage operation providing added security from damage for the property owner.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

The invention claimed is:

1. A thermal trigger assembly for remote mechanical actuation of another fire protection system component, the thermal trigger assembly comprising:
    an activation component including
        a base,
        a movable member movable with respect to the base,
        a bias member located with respect to the base to bias the movable member from a preactivation position with respect to the base to an activated position with respect to the base,
        a thermally responsive element retaining the movable member in the preactivation position until a predetermined thermodynamic condition is reached, the thermally responsive element being configured to lose structural integrity upon the predetermined thermodynamic condition, and
        a blocking member restrained by the thermally responsive element and retaining the movable member in the preactivation position until a loss of structural integrity of the thermally responsive element upon the predetermined thermodynamic condition; and
    a flexible connector including
        a flexible hollow outer cable housing with a first end configured to be stationarily connected with the another fire protection system component and a second end configured to be stationarily connected with the base, and
        a flexible inner member slidably located inside the flexible hollow outer cable housing for sliding movement within the outer cable housing and having a first end and a second end, the first end being configured for mechanical connection with a movable part of the another fire system component, and the second end configured to be stationarily connected with the movable member so as to be moved with respect to the flexible hollow outer cable housing by a movement of the movable member with the loss of structural integrity by the thermally responsive element upon the predetermined thermodynamic condition;
    wherein the movable member moves along a path of movement, and the thermally responsive element is offset from the path of movement; and
    wherein the base of the activation component has a longitudinal axis, a proximal end, a distal end, a cavity oriented essentially parallel to the longitudinal axis, a distal opening, and an extension extending distally from the base beyond the distal opening,
        the thermally responsive element is supported by the extension, and
        the extension comprises a fulcrum engaging the blocking member so that with the loss of structural integrity of the thermally responsive element, the blocking member undergoes a motion comprising pivoting about the fulcrum.

2. The thermal trigger assembly of claim 1, wherein the first end of the flexible hollow outer cable housing is configured for fixed connection with the another fire protection component and the first end of the flexible inner member is configured for mechanical connection with a movable part of the another fire protection component.

3. The thermal trigger assembly of claim 1, wherein the another fire protection component is a valve having a body with an inlet, at least one outlet, and a fluid passageway between the inlet and each outlet, a seal member supportable across the passageway to close the passageway by a pivotally mounted lever, the pivotally mounted lever being retained in a sealing position by a latch engaged with the lever, the first end of the flexible inner member being mechanically coupled with the latch for movement of the latch with respect to the lever by a movement of the first end of the flexible inner member.

4. The thermal trigger assembly of claim 1, wherein the extension comprises an enclosure for the thermally responsive element, and the enclosure includes an opening permitting a surrounding atmosphere to contact the thermally responsive element, and wherein a periphery of the thermally responsive element is located inwardly from the opening.

5. The thermal trigger assembly of claim 4, wherein the extension comprises two parallel plates, and the fulcrum comprises a transverse fulcrum member.

6. The thermal trigger assembly of claim 5, wherein the transverse fulcrum member comprises a shaft and a bushing member mounted upon the shaft, and wherein the blocking member comprises a lever pivotally mounted upon the shaft.

7. The thermal trigger assembly of claim 6, wherein the bushing member comprises a corrosion-resistant material.

8. The thermal trigger assembly of claim 7, wherein the corrosion-resistant material comprises polytetrafluoroethylene.

9. The thermal trigger assembly of claim 4, wherein the extension comprises a thermally responsive element portion including the enclosure and a fulcrum portion including the fulcrum, and wherein the thermally responsive element portion extends farther distally than the fulcrum portion.

10. The thermal trigger assembly of claim 4, further comprising a trim ring engaging the extension and configured to engage a surface through which the thermal trigger assembly is mounted.

11. The thermal trigger assembly of claim 4, wherein the blocking member is pivotally attached to the extension.

12. The thermal trigger assembly of claim 1, wherein the extension comprises a threaded movable support supporting the thermally responsive element.

13. A method of providing a dry sprinkler device comprising the steps of:
    connecting an inlet of a valve to a branch water line;
    mechanically connecting an activation component with a thermally responsive element to the valve with a Bowden cable so as to open the valve in response to a loss of physical integrity of the thermally responsive element; and
    fluidly connecting a water distribution device to an outlet of the valve to spray water received from the valve, wherein the activation component includes:
        a base,
        a movable member movable with respect to the base, a bias member located with respect to the base to bias the movable member from a preactivation position with respect to the base to an activated position with respect to the base, a thermally responsive element retaining the movable member in the preactivation position until a predetermined thermodynamic condition is reached, the thermally responsive element being configured to lose structural integrity upon the predetermined thermodynamic condition, and a blocking member restrained by the thermally responsive element and retaining the movable member in the preactivation position until a loss of structural integrity of the thermally responsive element upon the predetermined thermodynamic condition wherein the movable member moves along a path of movement, and the thermally responsive element is offset from the path of movement and wherein the base of the activation component has a longitudinal axis, a proximal end, a distal end, a cavity oriented essentially parallel to the longitudinal axis, a distal opening, and an extension extending distally from the base beyond the distal opening, the thermally responsive element is supported by the extension, and the extension comprises a fulcrum engaging the blocking member so that with the loss of structural integrity of the thermally responsive element, the blocking member undergoes a motion comprising pivoting about the fulcrum.

14. A method of installing a dry sprinkler device including a valve, an activation component with a thermally responsive element, and a flexible Bowden cable mechanically coupling the activation component with the valve so as to open the valve in response to a loss of physical integrity of the thermally responsive element comprising the steps of;

fluidly coupling an inlet of the valve with a water supply line;

installing a water distribution device at a location spaced apart from the valve and connecting the device with an outlet of the valve through intermediate piping; and installing the activation component at a location spaced apart from the valve, the valve being operatively connected with the activation component through the Bowden cable, wherein the activation component includes:

a base, a movable member movable with respect to the base, a bias member located with respect to the base to bias the movable member from a preactivation position with respect to the base to an activated position with respect to the base, a thermally responsive element retaining the movable member in the preactivation position until a predetermined thermodynamic condition is reached, the thermally responsive element being configured to lose structural integrity upon the predetermined thermodynamic condition, and a blocking member restrained by the thermally responsive element and retaining the movable member in the preactivation position until a loss of structural integrity of the thermally responsive element upon the predetermined thermodynamic condition; and wherein the movable member moves along a path of movement, and the thermally responsive element is offset from the path of movement and wherein the base of the activation component has a longitudinal axis, a proximal end, a distal end, a cavity oriented essentially parallel to the longitudinal axis, a distal opening, and an extension extending distally from the base beyond the distal opening, the thermally responsive element is supported by the extension, and the extension comprises a fulcrum engaging the blocking member so that with the loss of structural integrity of the thermally responsive element, the blocking member undergoes a motion comprising pivoting about the fulcrum.

15. A dry sprinkler device comprising:

a valve having a body with an inlet, at least one outlet, and a fluid passageway connecting the inlet with each outlet, a seal member supportable across the passageway to close the passageway by a pivotally mounted lever, the seal member being supported across the passageway in a sealing position by a latch releasably engaged with the pivotally mounted lever;

an activation component including a base, a movable member movable with respect to the base, a bias member located with respect to the base to bias the movable member from a preactivation position with respect to the base to an activated position with respect to the base, a thermally responsive element retaining the movable member in the preactivation position until a predetermined thermodynamic condition is reached, the thermally responsive element being configured to lose structural integrity upon the predetermined thermodynamic condition, and a blocking member restrained by the thermally responsive element and retaining the movable member in the preactivation position until a loss of structural integrity of the thermally responsive element upon the predetermined thermodynamic condition; and a flexible connector including a flexible hollow outer cable housing with a first end configured to be stationarily connected with a body of the valve and a second end configured to be stationarily connected with the base, and a flexible inner member slidably located inside the flexible hollow outer cable housing for sliding movement within the outer cable housing and having a first end and a second end, the first end being mechanically coupled with the latch for movement of the latch with respect to the pivotally mounted lever by a movement of the first end of the flexible inner member, and the second end configured to be stationarily connected with the movable member so as to be moved with respect to the flexible hollow outer cable housing by a movement of the movable member with the loss of structural integrity by the thermally responsive element upon the predetermined thermodynamic condition; and at least one water distribution device fluidly coupled with the at least one outlet;

wherein the movable member moves along a path of movement, and the thermally responsive element is offset from the path of movement and wherein the base of the activation component has a longitudinal axis, a proximal end, a distal end, a cavity oriented essentially parallel to the longitudinal axis, a distal opening, and an extension extending distally from the base beyond the distal opening, the thermally responsive element is supported by the extension, and the extension comprises a fulcrum engaging the blocking member so that with the loss of structural integrity of the thermally responsive element, the blocking member undergoes a motion comprising pivoting about the fulcrum.

16. The dry sprinkler device of claim 15, wherein at least one water distribution device is either an automatic fire sprinkler with a thermally responsive element and plug or an open fire sprinkler lacking a thermally responsive element and plug.

\* \* \* \* \*